Patented Dec. 11, 1934

1,984,147

UNITED STATES PATENT OFFICE 1,984,147

PROCESS FOR THE PRODUCTION OF CELLULOSE ESTERS AND CORRESPONDING ALKYL ESTERS

Carl J. Malm, Rochester, N. Y., assignor to Eastman Kodak Company, Rochester, N. Y., a corporation of New York No Drawing. Application October 22, 1929,
Serial No. 401,631

15 Claims. (Cl. 260—102)

This invention relates to the production of cellulose acetate, such as acetone-soluble or partially hydrolyzed cellulose acetate, and relates more particularly to a method of hydrolyzing cellulose triacetate which includes the conversion of any excess or residual acetic acid into a more easily separable compound, such as an ester of the acetic acid.

For decades, cellulose triacetate has been produced by the acetylation of suitable cellulose, such as cotton linters, the acetylation being carried out in an acetic acid bath by the use of acetic anhydride and a catalyst such as sulfuric acid. This cellulose triacetate, containing approximately 44.8% acetyl radical, is not, however, suitable for as many purposes as desired and, consequently, it is the practice to hydrolyze it, reducing the acetyl content of the latter usually to in the neighborhood of 38% to 42% acetyl. These known processes, however, have one notable disadvantage in that at the end of the hydrolysis and precipitation stage there remains a considerable quantity of rather dilute acetic acid which, because of the cost of the acetic acid, it is necessary to concentrate for reuse. Such concentration may be accomplished by an extraction process or by distillation, either of which is costly,— the extraction process because of expensive and complicated apparatus and the distillation because of the heat necessary to evaporate such large quantities of dilute acid.

The process described in application Serial No. 240,943 now Patent No. 1,823,359 of Harry LeB. Gray, filed December 17, 1927, has been highly instrumental in eliminating the extent of acetic acid recovery required in the two-stage production of acetone-soluble cellulose acetate in that by employing a solvent for cellulose triacetate, such as ethylene dichloride, the amount of acetic acid necessary to be used is reduced to from approximately one-fourth to one-tenth of that heretofore necessary. The Gray process, although a distinct advance in the art, has the weakness from the commercial standpoint that there still remains some dilute acetic acid which must be concentrated for reuse.

I have discovered that notable savings may be accomplished in the production of cellulose acetic by employing an acetylation step similar to that described in the above Gray application, followed by a hydrolysis step in which alcohol is added to the acetylation mixture in conducting the hydrolysis step. In other words, I have discovered that a distinctly improved hydrolysis step is accomplished by adding methyl or ethyl alcohol to an acetylation mixture of cellulose triacetate, ethylene chloride, acetic acid, acetic anhydride and a catalyst, the alcohol being added in excess of the amount theoretically necessary to esterify all of the acetic anhydride and acetic acid present, the acetic acid ester being readily separable from the other components of the precipitation bath by simple distillation.

The reaction of alcohol with acetic acid to form ethyl acetate and water has, of course, been known for a long time and it has also even been known that the water necessary for the hydrolysis of an acetylation mixture composed of cellulose triacetate and residual catalyst may be supplied by the addition of small amounts of alcohol to the acetylation mixture with the consequent production of sufficient water to conduct the hydrolysis. A correspondingly small amount of ethyl acetate would at the same time be formed. This type of hydrolysis, however, has been distinctly limited by the fact that sufficient alcohol to esterify the acetic anhydride and acetic acid cannot be added for the reason that these quantities of alcohol would cause the precipitation of the cellulose acetate. It is, therefore, impossible by this last-described hydrolysis step to completely esterify the acetic acid present for the reason that sufficient acetic acid must remain in the hydrolysis bath to maintain the cellulose acetate in solution during the hydrolysis.

Contrasted with the above described known methods, I add methyl or ethyl alcohol in substantial excess of that required to completely convert the acetic acid present into methyl or ethyl acetate respectively, the ethylene chloride and alcohol present forming a solvent which maintains the cellulose acetate in solution, thereby freeing the acetic acid of that responsibility to permit it to be esterified. Any residual acetic anhydride is, of course, esterified by the alcohol before the beginning of the hydrolysis.

My process will be better understood from a specific example thereof, although it will be understood that considerable latitude in proportions, temperatures, time etc., are permitted within the limitations heretofore imposed. As an example of my process, I may state that to 100 pounds of cellulose, such as cotton linters, may be added about 100 pounds of glacial acetic acid and approximately 700 pounds of ethylene chloride. It is better that this mixture be heated to approximately 150° F., for about four hours and then cooled to 65° F., although this pretreatment will be understood to be desirable rather than necessary. To the above mixture, at approximately 65° F., may then be added 300 pounds of 85% acetic anhydride, 450 cc. of sulfuric acid and 1350 cc. of phosphoric acid and the mixture allowed to acetylate at a temperature of from 65° to 100° F. The mixture of sulfuric and phosphoric acids operates as the catalyst, although it will be understood that an equivalent proportion of sulfuric acid alone could quite readily be employed. When acetylation has proceeded to the point where a homogeneous, clear dope is obtained (showing that acetylation is complete), approximately 300 pounds of ethyl alcohol may be slowly added to the mixture with stirring. This mixture may then be kept at approximately 100° F., until the desired acetone-solubility of the cellulose acetate is obtained, usually about one week, whereupon the mixture is poured through a header into boiling water. The vapors thus produced are passed through a condenser, whereupon we find that a mixture of ethylene chloride, ethyl acetate, ethyl alcohol and water is obtained. The components of this mixed condensate are then separated by ordinary fractional distillation by known, simple processes. Although the majority of the ethylene chloride, ethyl acetate and ethyl alcohol will be "flashed out" upon the hydrolysis mixture being precipitated in boiling water, further boiling of the water may be conducted, if necessary, for sufficient time to completely drive therefrom all of the ethylene chloride, ethyl acetate and ethyl alcohol.

Instead of the above proportions of acetic acid, ethylene chloride and acetic anhydride, I may employ the proportions referred to in the above Gray patent application. To an acetylation mixture so produced may be added an excess of alcohol for conducting the hydrolysis step,—for instance, about three parts of ethyl alcohol to each part of glacial acetic acid originally used may be added. The hydrolysis step would be conducted in a manner similar to my above described example. Also in either of these above described examples, approximately an equimolecular amount of methyl alcohol may be employed instead of ethyl alcohol.

From the above described examples, it will be observed that the addition of the alcohol to the acetylation mixture in excess, of that necessary to esterify the acetic acid, has a three-fold purpose,—

1. Ethyl acetate is produced which in itself is a valuable product;
2. Water is generated in sufficient amount to carry on the hydrolysis; and
3. The excess of alcohol mixing with ethylene chloride present forms a solvent for the cellulose acetate, thus maintaining the cellulose acetate in solution while the acetic acid is being converted into an ester.

A summary of these three features might be stated to be the recovery of acetic acid by the production during the hydrolysis step of the valuable by-product, ethyl acetate, which is easily recoverable from the precipitation bath The ethyl acetate produced by this method is a valuable product much desired upon the open market and the ethylene chloride and ethyl alcohol, which are also recovered in the fractional distillation, following condensation of the vapors from the precipitation bath, may be re-employed in subsequent operation of the process. Numerous other advantages might be enumerated, but will occur to those familiar with such processes.

While I have described the use of ethylene chloride (sometimes referred to as ethylene dichloride) as the organic liquid which with the alcohol forms a solvent for the hydrolyzed cellulose acetate it will be apparent that I may employ other such organic liquids or that I may employ an organic liquid which by itself is a solvent, such as chloroform or tetrachlorethane. Inasmuch as these are by themselves solvents for cellulose acetate, they would also be solvents when mixed with the alcohol. Thus I may acetylate in the presence of about the same proportion of either chloroform or tetrachlorethane as ethylene chloride. The organic solvent liquid, of course, must not be one which reacts with the alcohol as this would doubtless precipitate the acetate or otherwise deleteriously affect the process. So long as it is a solvent, such as those named, with alcohol it could not, of course, be one which reacts with the alcohol.

While I have described the acetylation step as one involving the use of an organic liquid, such as ethylene chloride, to lessen the amount of acetic acid necessary it is to be understood that this procedure is preferred because of economy in the steps subsequent to acetylation rather than because of necessity. Thus it would be possible to acetylate the cellulose in the usual way and then, in the hydrolysis step which I have perfected, add alcohol in excess of that theoretically required to esterify the acetic acid present and ethylene chloride in sufficient amount to, with the alcohol, maintain the cellulose acetate in solution.

It will be understood, however, that this last described method requires, because of the increased amount of acetic acid present in the bath, greatly increased quantities of alcohol and ethylene chloride which adds to the cost of the operation and makes present just that much more ethylene chloride, alcohol and ethyl acetate to be later separated.

Also while I have described my process in connection with the production of cellulose acetate with acetic acid, it may also be employed in connection with the production of cellulose proprionate with proprionic acid or of other cellulose acylates with similar homologues of acetic acid, the production of which is well known in the art.

As above referred to, I do not intend that I shall be limited by the specific examples given, as variations may be employed in proportions, temperatures, time, etc. For instance, the excess of alcohol added need only be sufficient to esterify the acetic acid and form, with the ethylene chloride, a solvent mixture for the cellulose acetate, although there would be no objection to employing a reasonably large excess other than that the cost of the alcohol and subsequent separation thereof becomes a factor. Smaller proportions of ethylene chloride would merely require the addition of more acetic acid, which is not especially to be desired. Other changes will doubtless occur to those skilled in the art and my invention, it will be understood, is to be limited only by the claims appended hereto.

What I claim as my invention and desire to be secured by Letters Patent of the United States is:

1. In the production of hydrolyzed cellulose acetate from an acetylation bath containing cellulose acetate, acetic acid and an inert organic liquid which with lower aliphatic alcohol will dissolve cellulose acetate, the step which comprises hydrolyzing the cellulose acetate in the presence of a saturated monohydroxy alcohol containing less than three carbon atoms in an amount in excess of that theoretically required to esterify the acetic acid present.

2. In the production of hydrolyzed cellulose acetate from an acetylation bath containing cellulose acetate, acetic acid and an inert chlorinated organic liquid which with lower aliphatic alcohol will dissolve cellulose acetate, the step which comprises hydrolyzing the cellulose acetate in the presence of a saturated monohydroxy alcohol containing less than three carbon atoms in an amount in excess of that theoretically required to esterify the acetic acid present.

3. In the production of hydrolyzed cellulose acetate from an acetylation bath containing cellulose acetate, acetic acid and ethylene chloride which with alcohol will dissolve cellulose acetate, the step which comprises hydrolyzing the cellulose acetate in the presence of a saturated monohydroxy alcohol containing less than three carbon atoms in an amount in excess of that theoretically required to esterify the acetic acid present.

4. In the production of hydrolyzed cellulose acetate from an acetylation bath containing cellulose acetate, acetic acid and ethylene chloride which with alcohol will dissolve cellulose acetate, the step which comprises hydrolyzing the cellulose acetate in the presence of ethyl alcohol in excess of that theoretically required to esterify the acetic acid present.

5. In the production of hydrolyzed cellulose acetate from an acetylation bath containing cellulose acetate, acetic acid and an inert organic liquid which with lower aliphatic alcohol will dissolve cellulose acetate, the step which comprises hydrolyzing the cellulose acetate in the presence of ethyl alcohol in excess of that theoretically required to esterify the acetic acid present.

6. The process which comprises acetylating cellulose in the presence of acetic acid and an inert organic liquid which with lower aliphatic alcohol will dissolve cellulose acetate and, in the acetylation bath so produced, hydrolyzing the cellulose acetate in the presence of a saturated monohydroxy alcohol containing less than three carbon atoms in an amount in excess of that theoretically required to esterify the acetic acid present.

7. The process which comprises acetylating cellulose in the presence of acetic acid and an inert organic liquid which with lower aliphatic alcohol will dissolve cellulose acetate and, in the acetylation bath so produced, hydrolyzing the cellulose acetate in the presence of ethyl alcohol in excess of that theoretically required to esterify the acetic acid present.

8. The process which comprises acetylating cellulose in the presence of acetic acid and ethylene chloride and, in the acetylation bath so produced, hydrolyzing the cellulose acetate in the presence of a saturated monohydroxy alcohol containing less than three carbon atoms in an amount in excess of that theoretically required to esterify the acetic acid present.

9. The process which comprises acetylating cellulose in the presence of acetic acid and, in the acetylation bath so produced, hydrolyzing the cellulose acetate in the presence of a saturated monohydroxy alcohol containing less than three carbon atoms in an amount in excess of that theoretically required to esterify the acetic acid present and also in the presence of an inert organic liquid which with the lower aliphatic alcohol is a solvent for cellulose acetate.

10. The process which comprises acetylating cellulose in the presence of acetic acid and, in the acetylation bath so produced, hydrolyzing the cellulose acetate in the presence of ethyl alcohol in excess of that theoretically required to esterify the acetic acid present and also in the presence of an inert organic liquid which with the lower aliphatic alcohol is a solvent for cellulose acetate.

11. The process which comprises acetylating cellulose in the presence of acetic acid and, in the acetylation bath so produced, hydrolyzing the cellulose acetate in the presence of a saturated monohydroxy alcohol containing less than three carbon atoms in an amount in excess of that theoretically required to esterify the acetic acid present and also ethylene chloride.

12. In the process for the hydrolysis of cellulose esters in a bath containing a saturated organic acid, the step which comprises substantially completely esterifying the organic acid with a saturated monohydroxy alcohol containing less than three carbon atoms in the presence of an inert organic liquid which retains the cellulose ester in solution.

13. In the process for the hydrolysis of cellulose acetate in a bath containing acetic acid, the step which comprises substantially completely esterifying the acetic acid with a saturated monohydroxy alcohol containing less than three carbon atoms in the presence of an inert organic liquid which retains the cellulose ester in solution.

14. The process which comprises acetylating cellulose in the presence of acetic acid and an inert organic liquid which with lower aliphatic alcohol will dissolve cellulose acetate and, in the acetylation bath so produced, hydrolyzing the cellulose acetate in the presence of a saturated monohydroxy alcohol containing less than three carbon atoms in an amount in excess of that theoretically required to esterify the acetic acid present, precipitating the cellulose acetate so produced by feeding the hydrolysis mixture into hot water and recovering the vapors so produced.

15. The process which comprises acetylating cellulose in the presence of acetic acid and an inert organic liquid which with lower aliphatic alcohol will dissolve cellulose acetate and, in the acetylation bath so produced, hydrolyzing the cellulose acetate in the presence of a saturated monohydroxy alcohol containing less than three carbon atoms in an amount in excess of that theoretically required to esterify the acetic acid present, precipitating the cellulose acetate so produced by feeding the hydrolysis mixture into hot water, and fractionally separating the alcohol, the organic solvent liquid and the acetic acid ester of the alcohol.

CARL J. MALM.